Oct. 24, 1967   P. FAHLENBERG   3,348,462
PHOTOGRAPHIC CAMERA
Filed April 7, 1965   5 Sheets-Sheet 1
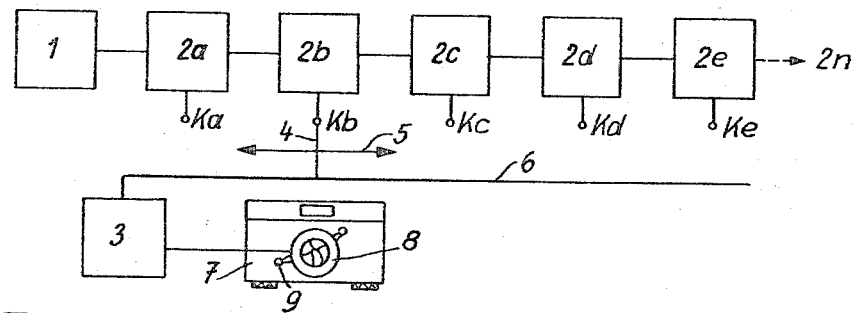
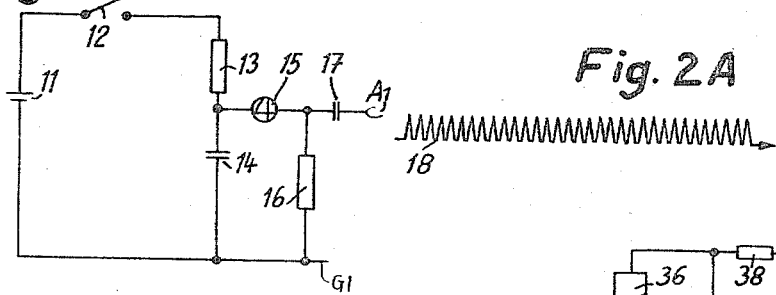
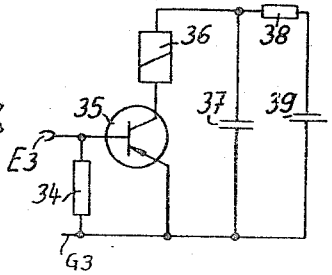
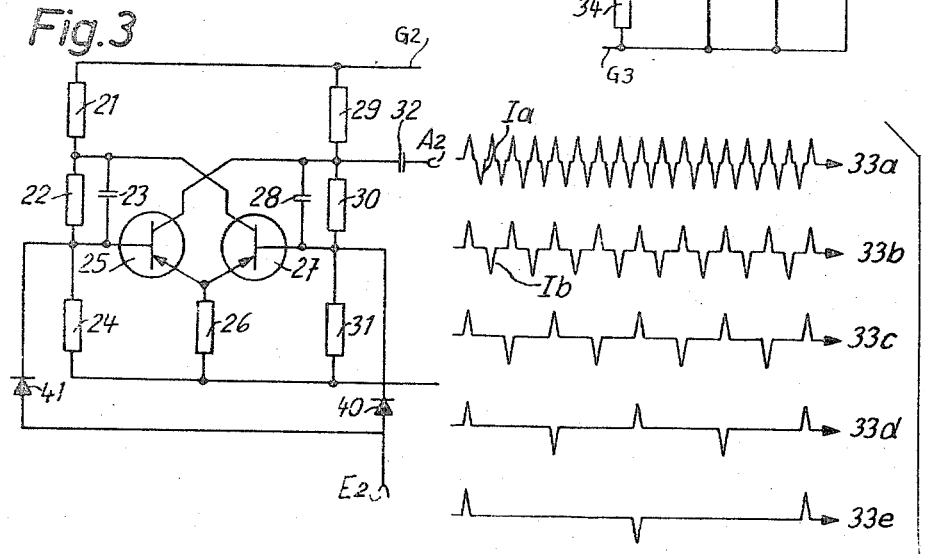

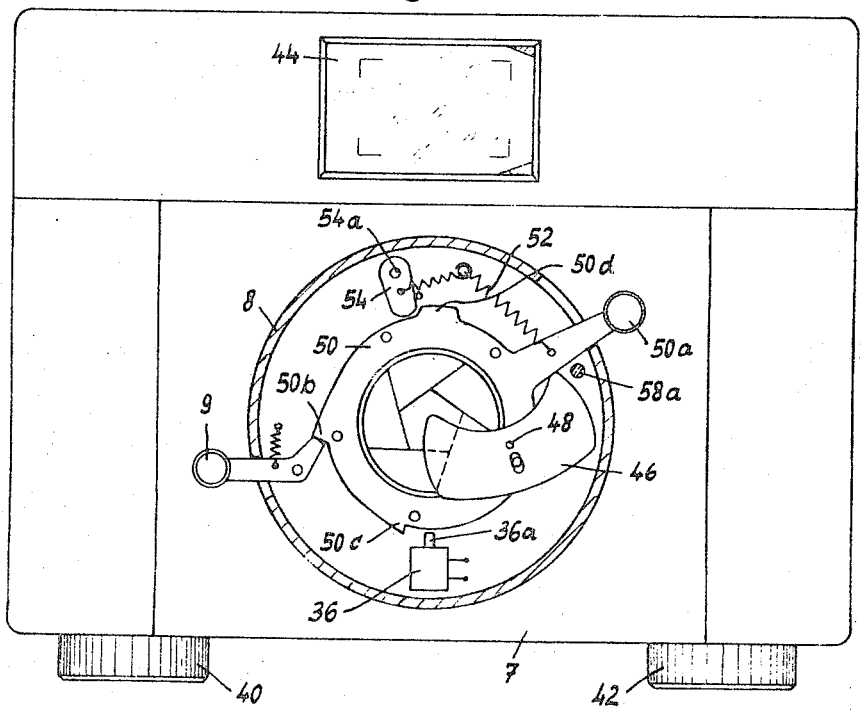
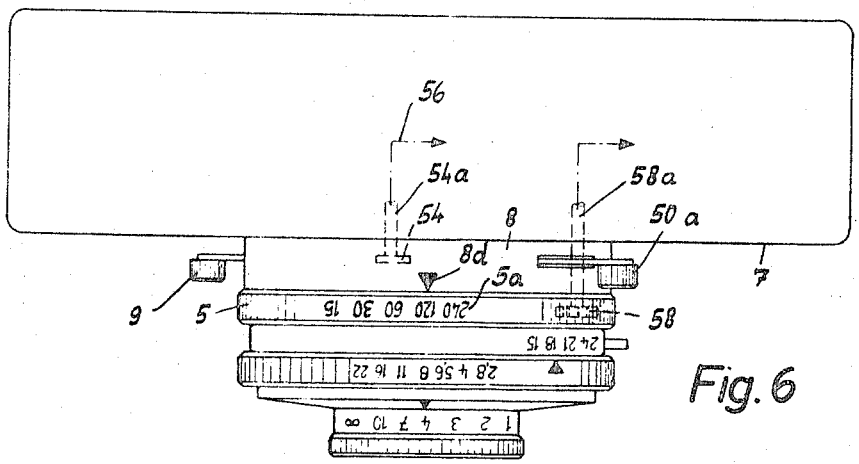

Oct. 24, 1967   P. FAHLENBERG   3,348,462
PHOTOGRAPHIC CAMERA
Filed April 7, 1965   5 Sheets-Sheet 3

United States Patent Office 3,348,462
Patented Oct. 24, 1967

3,348,462
PHOTOGRAPHIC CAMERA
Paul Fahlenberg, Baierbrunn, near Munich, Germany, assignor to Compur-Werk Gesellschaft mit beschrankter Haftung & Co., Munich, Germany, a German firm
Filed Apr. 7, 1965, Ser. No. 446,214
Claims priority application Germany, Apr. 10, 1964, C 32,619; Apr. 16, 1964, C 32,657
21 Claims. (Cl. 95—53)

ABSTRACT OF THE DISCLOSURE

There is disclosed a photographic camera having an electronic pulse generator, the output of which is connected to the input of a first frequency divider whose output is connected to the input of a second frequency divider whose output, in turn, is connected to the input of a third frequency divider, and so on. In one embodiment, a selector switch connects the output of any selected one of the frequency dividers to an amplifier stage, the output of which operates a solenoid to control the duration of a photographic exposure. In another embodiment, there are two amplifier stages, one of which is connected selectively to the output of any desired one of the frequency dividers, and the conjoint action of the two amplifier stages serves to produce a series of photographic exposures in rapid succession. Also an arrangement is disclosed wherein an electrical impulse does not necessarily power a complete movement of a shutter part through its entire range, but may merely provide power for the first part of such movement, the movement then being completed by other power means such as a spring.

---

This invention relates to a photographic camera, and more particularly to a camera in which the shutter speed or duration of the exposure is controlled electrically. One feature of the invention relates also to such a camera in which there is electrically controlled means for making a series of exposures in rapid succession, such a camera sometimes being called a series camera or sequence camera.

An object of the invention is the provision of a generally improved and more satisfactory camera in which the exposure is electrically controlled.

Another object is the provision of a generally improved and more satisfactory series camera for taking, in rapid succession, a series of individual still pictures.

Still another object is the provision of an electrical control system which is more simple, reliable, and easily installed than those of the prior art.

A further object is the provision of an electrical control system for camera exposures, sufficiently versatile so that it may be used for exposures of a number of different speeds or durations, and sufficiently compact so that the electrical system may be installed either in the shutter housing or in the camera body, or partly in one and partly in the other, without any substantial increase in the size of the shutter housing or the camera body as compared with prior art cameras and shutters for taking pictures of the same size.

A still further object is the provision of improved means for controlling the mechanical parts of a camera shutter from an electric pulse.

Another object is the provision of a camera shutter in which movement of a mechanical part is initiated by an electric pulse of too short a duration to be able to complete the required mechanical movement, and in which other power means, such as a spring, then completes the movement initiated by the brief pulse.

These and other desirable objects may be attained in the manner disclosed as an illustrative embodiment of the invention in the following description and in the accompanying drawings forming a part hereof, in which:

FIG. 1 is a diagrammatic view illustrating a first electrical control system or arrangement according to the present invention;

FIG. 2 is a wiring diagram illustrating details of a preferred form of the pulse generator constituting part of the system shown in FIG. 1;

FIG. 2A is a graphic illustration of the pulse generated by the generator shown in FIG. 2;

FIG. 3 is a wiring diagram of a preferred form of one of several similar pulse dividers used in the system or arrangement illustrated in FIG. 1;

FIG. 3A is a graphic representation of the pulse output of several successive pulse dividers of the kind shown in FIG. 3, when connected to each other in accordance with FIG. 1;

FIG. 4 is a wiring diagram of a preferred form of the end stage or amplifier stage of the electrical control system;

FIG. 5 is a front elevational view of a camera structure, with parts omitted and parts in vertical section, illustrating the application to a typical camera of the electrical control arrangement or system illustrated in FIG. 1;

FIG. 6 is a top plan view of the camera shown in FIG. 5, illustrating additional details;

Figure 7:
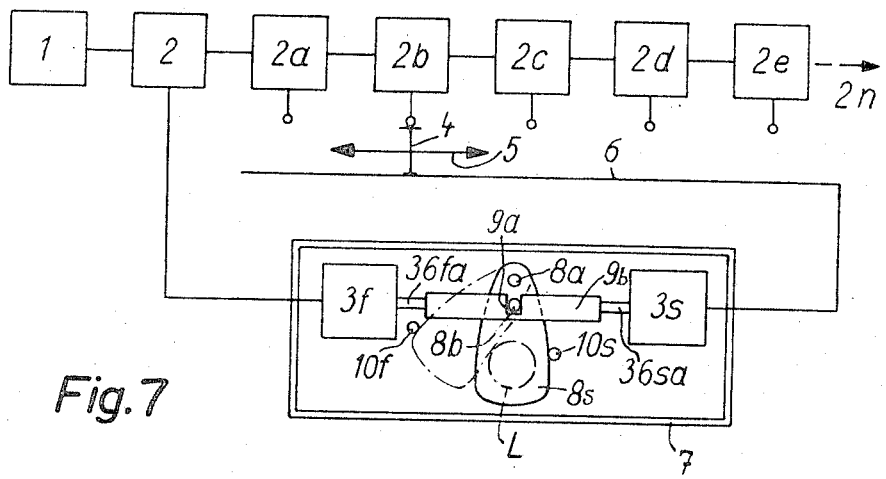
FIG. 7 is a diagrammatic view similar to FIG. 1, illustrating the application of the present invention to a different form of camera shutter.

A first aspect of the present invention relates to electrical or electronic circuit means for timing the duration of exposure of a single picture, or for timing the durations and intervals of a rapid series of exposures taken by what is called a series camera or a sequence camera. A second aspect of the invention relates to the manner in which an electric impulse (whether produced by the circuit means fo the first aspect, or produced by other means) serves to operate or control the mechanical movement of the shutter parts.

According to the first aspect above mentioned, there is provided a pulse generator, the output of which is connected to the input of a frequency divider which produces an output pulse of half (or other appropriate fraction) of the frequency of the pulse fed to its input. The output pulse of the first frequency divider is fed, in turn, to the input of a second frequency divider whose output, in turn, is fed to the input of a third frequency divider, and so on, using a series of as many frequency dividers as needed to produce the desired range of different exposure times or shutter speeds. Suitable taps are provided at the output of each frequency divider, and there is a selector switch through which the output of the selected frequency divider is fed to what may be called the end stage or amplifier stage of the circuit means. In this stage, the pulse from the selected one of the frequency dividers is amplified and is impressed on a magnetic winding, the action of which controls the action of the photographic shutter, at least in part.

Pulse generators, per se, and frequency dividers, per se, and end stages, per se, are well known and conventional in the electronics art. Any known pulse generator, and any known frequency divider, and any known end stage, may be used for the purposes of the present invention. The present invention does not reside in the specific construction of the pulse generator or the specific construction of the frequency dividers (although specific constructions of these are disclosed as illustrative examples) but rather in the way these elements are operatively connected to each other and to the end stage, and are used for controlling the operation of the camera shutter. Suitable pulse generators, frequency dividers, and end stages are all obtainable commercially on the market, as flat elements of extremely small dimensions made by mass production methods. This greatly simplifies the fabrication of the camera and shutter according to the present invention.

Referring now to the drawings in detail, FIG. 1 is a view, largely in the form of a block diagram, illustrating the principle of the arrangement of the electrical system for controlling the shutter speed or duration of exposure. There is a known form of electrical pulse generator diagrammatically indicated by the block 1. Following this, there is a series of frequency dividers, each of any suitable known form, indicated diagrammatically by the blocks 2a, 2b, 2c, 2d, and 2e. Five such frequency dividers are shown merely as an example, as it is possible to use any desired number of frequency dividers, as suggested by the notation 2n. The number (n) of frequency dividers connected in series with each other can be chosen as desired, the only requirement being that they should correspond in number to the number of different exposure times or durations or speeds desired in the camera shutter.

An end stage is indicated diagrammatically by the block 3. This end stage is an amplifier, and is connectable to the output of any desired one of the frequency dividers 2a . . . 2n, by selective switching means such as a slider 4 operated by operating means 5 which moves the slider back and forth to establish electrical connection between the contact leaf or conductor strip 6 (which leads to the end stage 3) and any selected one of the individual contact member Ka, Kb, Kc, etc., connected respectively to the output circuits of the frequency dividers 2a, 2b, 2c, etc. In the position shown in FIG. 1, as an example, the slider 4 operatively connects the end stage 3 to the output of the second frequency divider 2b.

The photographic camera is shown schematically at 7, and comprises a shutter shown schematically at 8, which is released for making an exposure by operating the trip lever or trigger 9. Except for the electrical control as herein disclosed, the camera itself and the shutter on the camera may be of any conventional known construction.

The above mentioned elements 1 through 6 of the electrical system may be mounted in a separate switch box electrically connected to the camera 7, or if desired they may be mounted in the camera housing or casing, or in the shutter housing or casing, or partly in the camera housing and partly in the shutter housing. Since the electronic elements are small, flat, and compact, they can easily be mounted in these housings without any substantial increase in the normal size of the camera and shutter as customarily used in the prior art for taking a picture of any given size.

The pulse generator 1 may take the form of a sweep generator with a four-layer diode, as illustrated in FIG. 2. It comprises a source of direct current such as the battery 11, connected through a switch 12 (operationally connected to the shutter trip 9) in series with a resistor 13 and a capacitor 14. The four-layer diode is shown at 15 and is connected as shown to a further resistor 16 and capacitor 17. The output point of the pulse generator 1 is indicated at A1.

When the switch 12 is closed, the capacitor 14 is charged until the breakdown voltage of the four-layer diode 15 is reached. At this moment, a current pulse flows through the resistor 16 to the capacitor 17. This procedure is repeated as long as the switch 12 remains closed, thereby producing at the output point A1 to the pulse output or chain schematically shown at 18 in FIG. 2A.

As will be apparent from FIG. 1, this output pulse of the generator 1 is fed to the input of the first frequency divider 2a. All of the frequency dividers may be of the same construction, and may be as shown in FIG. 3, where the input connection is shown at E2. Its output point is shown at A2. The frequency divider may take any form known in the electronics art, the form illustrated in FIG. 3, comprising a flip-flop stage equipped with transistors 25 and 27. The circuit also includes resistors 21, 22, 24, 26, 29, 30, and 31, and capacitors 23, 28, and 32, all electrically connected to each other in the manner fully shown in FIG. 3, the connections being readily understandable without further explanation by those skilled in the electronics art.

Let it be assumed that the transistor 25 is conductive and the transistor 27 is blocked. Consequently, current flows through the collector resistor 29. Now if a first positive pulse arrives at the input E2, the transistor 25, which had previously been conductive, is blocked and the transistor 27 becomes conductive, so that the current suddenly ceases to flow through the resistor 29 and a first positive pulse is produced at the output A2. When a second positive pulse arrives at the input E2, it blocks the previously conductive transistor 27, and makes the transistor 25 conductive. As a consequence, a second pulse, but this time a negative pulse, is produced at the output A2. The third positive pulse reaching the input produces a third output pulse, which is positive. The fourth positive input pulse results in a fourth output pulse, which is negative, and so forth.

Thus the frequency divider illustrated in FIG. 3 has the property of switching over from one sign to the other (positive to negative, or negative to positive) at each pulse fed to its input, but emits only a negative pulse at its output for every second input pulse. The frequency dividing stage as illustrated is blocked against incoming negative pulses by the rectifiers 40 and 41, so that it can be controlled, as required, either by a positive pulse chain applied to its input E2, or by an alternating positive-negative pulse chain applied to the input. In either event, the positive-negative pulse chain which is in turn produced at its output A2 is divided by the factor "2," that is to say it produces a pulse chain at half the frequency of the pulse chain which is imparted to it.

The output of the first frequency divider 2a is connected to the input of the second frequency divider 2b, and the output of the second is conected to the input of the third frequency divider 2c, and so on. The result is that the output of the first frequency divider 2a produces a pulse chain or series as indicated diagrammatically at 33a in FIG. 3A, with half the frequency of the original input pulse chain 18. The second frequency divider 2b has an output chain as indicated diagrammatically at 33b in FIG. 3A, at half the frequency of the output of the previous divider 2a. The third frequency divider 2c has an output as indicated diagrammatically at 33c, at half the frequency of the output of the previous divider. Similar action continues to the end of the series of frequency dividers, there being as many frequency dividers as desired, as already explained above.

As mentioned above, each frequency divider has a tap leading from its output circuit to a connection as indicated at Ka, Kb, Kc, etc., in position to be selectively engaged by the slider 4 which will connect the selected one of the output circuits to the conductor 6 leading to the end stage or amplifier stage 3.

The end stage or amplifier stage 3 may be constructed as illustrated in FIG. 4. The input point of this stage is indicated at E3, to which point the conductor 6 is connected, so that through the conductor 6 and the slider 4, the input of the stage 3 receives the output pulse of any selected one of the frequency dividers 2a, 2b, 2c, etc. The end stage includes a resistor 34, transistor 35, magnetic winding 36, capacitor 37, resistor 38, and battery 39, all connected to each other in the manner clearly illustrated in FIG. 4, which will be readily understood by those skilled in the electronics art. The magnetic winding 36 in this circuit is equipped with an armature which is used to operate or control the camera shutter. In the arrangement illustrated, the amplifier stage becomes conductive only upon receipt of a negative electrical pulse, so that the magnetic winding is energized only in the case of a negative pulse.

The other side or second side of the circuit of each of the elements 1, 2a, 2b, etc., and 3 is represented by the conductors G1, G2, and G3, which are appropriately connected in the conventional way well understood in the electronics art.

The camera 7 and its shutter 8, illustrated in abbreviated diagrammatic form in FIG. 1, are shown in more detail in FIGS. 5 and 6, to which reference is now made. Except for the electrical control parts as herein described, both the camera and the shutter may be of a conventional known construction. The body 7 has, for example, a film winding knob 40, a film rewinding knob 42, and a viewfinder 44. The shutter 8 has a housing or casing secured to the front wall of the camera body 7. Shutter blades 46 are mounted to swing on fixed pins 48 within the shutter casing, the blades being of any desired number, such as five, but only one of them is shown in FIG. 5, so as not to confuse the drawings. The blades swing on the above mentioned pivots 48 from an open position, permitting light to pass through the exposure aperture, to a closed position in which the blades overlap each other to prevent passage of light, all as well understood by those skilled in the photographic shutter art. The blades are operated by means of a blade driving or operating ring, commonly called a blade ring, shown at 50 and rotatable about the optical axis (the center of the exposure aperture) as a center of rotation. A blade driving spring 52 tends to drive the blade ring 50 in a counterclockwise direction. When the blade ring is tensioned or cocked by means of the externally accessible handle 50a, which can be used to turn the blade ring in a clockwise direction to load the spring 52, it is held in its tensioned or cocked position by the latch 9 engaging the abutment shoulder 50b on the blade ring.

The construction as illustrated, where the trigger or release member 9 holds a blade ring 50 which is pivotally connected to the blades and which moves in a single direction both to open and to close the blades, is suitable for use with double-ended or two-lobe blades, as illustrated. Those skilled in the art will recognize, however, that if one prefers to employ single lobe blades which move first in one direction to open the exposure aperture and then in the opposite direction to close the aperture, the blades will be pivotally connected to a blade ring which rotates first in one direction to open the blades and then in the opposite direction to close the blades, and this blade ring will be driven in the conventional manner, first in one direction and then in the other, by movement in a single direction of what is commonly called a master member. In such a construction the trigger or release member 9 would, of course, serve to hold the master member rather than the blade ring, and the electrically operated mechanism for holding the blades temporarily open to determine the length of exposure, as further described below, would operate upon the master member rather than upon the blade ring. Since the present invention is applicable to both types of shutters, the expression "blade operating member" is intended to refer to either the blade ring or the master member, as the case may be.

When using double-ended or two-lobe blades such as illustrated in FIG. 5, which have to be returned from rest or run-down position to initial starting position before making the next exposure, the usual conventional masking blades, sometimes collectively referred to as a "shutter blind," are employed to prevent passage of light through the exposure aperture during the tensioning or cocking of the shutter to restore the blades to their initial starting position. Such masking blades or shutter blind parts, being well known in the art, are omitted from the drawings for the sake of clarity. Of course it is not necessary to use such masking blades, if the shutter blades themselves are of the single lobe type which do not require to be moved from their closed positions between successive exposures.

Installed in the shutter housing or casing, as seen in FIG. 5, is the magnetic winding 36 of the end stage 3, having an armature 36a which projects, when in its rest position, into the path of travel of a nose 50c on the blade operating member and temporarily arrests this member during its running-down movement in a position in which the shutter blades themselves are fully open.

In addition, the shutter casing or housing contains a switch member 54 fixed to a shaft or spindle 54a which extends rearwardly from the shutter casing into the associated camera and which operates a control cam schematically shown at 56. This control cam operates, by means of any conventional mechanical connection not here illustrated, the switch 12, the closing of which initiates operation of the electric control parts. When the shutter parts are in the cocked or tensioned position shown in FIG. 5, the switch member 54 lies right next to a projection or cam portion 50d on the blade operating member 50. When the trigger 9 is tripped and the blade operating member starts its running down movement, the cam 50d immediately moves the switch member 54 to close the switch 12.

The shutter 8 also comprises a shutter speed setting ring 5 which is rotatable about the optical axis, and which carries the usual conventional shutter speed or exposure time scale 5a, adjusted relative to a fixed mark or reference point 8d on the shutter housing 8. The ring 5 has internal gear teeth of conventional kind, meshing with a toothed pinion 58 which is fixed to a shaft or spindle 58a extending rearwardly into the camera where it is operatively connected by any suitable conventional mechanical connection to the slide contact 4 of the electrical control parts, so that rotation of the shutter speed setting ring 5 moves the slide or wiper 4 to establish electrical connection between the amplifier stage 3 and the appropriate one of the frequency divider stages 2a, 2b, 2c, etc., through contact with the appropriate one of the tap contacts Ka, Kb, Kc, etc.

The other rotatable rings on the shutter, illustrated in FIG. 6, are conventional and form no part of the present invention, so have not been specifically identified by reference numerals. Merely for the sake of brief identification, it may be said that the ring having a scale graduated from 2.8 to 22 is the diaphragm aperture setting ring; the ring having a scale graduate from 1 to 10 is the focus distance adjusting ring; and the ring having graduations from 15 to 24 is the film speed or film sensitivity setting ring. All of these are conventional and well known, and would normally be recognized by those skilled in the photographic shutter art, merely from the nature of the graduations on the respective scales.

In the embodiment illustrated in FIGS. 5 and 6, all the component elements 1 through 6 of the electrical arrangement, except the magnetic winding 36 and its armature 36a, are installed in the camera housing or casing 7. Since the details of installation are not essential to an understanding of the invention, these elements have not been illustrated in FIGS. 5 and 6, as they are sufficiently illustrated in FIGS. 1–4.

The various component elements and the inertial constants of the mechanical parts of the shutter, on the one hand, and of the electrical sysem, on the other hand, are selected in such relation to each other that the first negative pulse (I*a* in FIG. 3A) of the pulse chain 33*a* from the first frequency divider 2*a*, which is the first to excite the magnetic winding 36, is emitted rapidly after the switch 12 has been closed, in such a way that the armature 36*a* of the magnet is pulled out of the path of travel of the projection 50*c* on the blade operating member 50 before this projection can reach it. In these circumstances, the blade operating member 50 runs down without obstruction, and produces an exposure of the minimum duration or maximum speed of which the mechanical construction of the shutter is capable. Simply for the sake of an example, this may be assumed to be an exposure of $\frac{1}{240}$ of a second. In the case of all other shutter speed settings, the armature 36*a* of the magnet 36 holds the blade operating member 50 temporarily stationary in a position in which the shutter blades are fully open, and then frees it or releases it for further travel to close the blades, when the first negative pulse for the magnet winding is emitted after the closure of the switch 12, and after a lapse of time which is measured in accordance with the particular frequency divider whose output has been switched into the circuit of the amplifier 3 by adjustment of the slider 4.

In the particular setting illustrated in FIGS. 1 and 6 of the drawings, the shutter has been set for an exposure of $\frac{1}{120}$ of a second, and to produce this speed of exposure, the slider 4 makes connection with the output circuit of the second frequency divider 2*b* as seen in FIG. 1. Thus, after the shutter has been released by operating the trip or trigger 9, the blade operating member 50 runs down in a counterclockwise direction under the influence of the power spring 52, until the blades 46 are in their open position, at which point the blade operating member 50 is temporarily held by the armature 36*a* of the winding 36. The switch operating member 54 has been operated by the projection 50*d* on the blade operating member 50 right at the beginning of the exposure movement, so as to close the switch 12 at this time. This starts the operation of the pulse generator 1, through the agency of the control cam 56 and the switch 12, simultaneously with the beginning of the running down movement of the shutter, so that the periodic pulse chain 18 is started and is applied to the input E2 of the first frequency divider 2*a*, and this frequency divider transmits its output pulse chain 33*a* to the input of the next frequency divider 2*b*, whose output pulse chain 33*b* is transmitted through the output contact K*b* and slider 4 and conductor 6 to the end stage or amplifier stage 3. The first negative pulse I*b* of this chain 33*b* now operates the magnetic winding 36, to retract the armature 36*a*, so that the blade operating member 50 is now set into motion again and can complete its running down movement under the influence of the driving spring 52, to close the shutter blades. Thus the picture is taken with an exposure of $\frac{1}{120}$ of a second.

In the embodiment of the invention described above, only one single pulse of the selected chain of pulses (33*a*, 33*b*, 33*c*, etc., as the case may be) is used to control the shutter. In other words, the first negative pulse which reaches the amplifier stage 3 is effective upon the magnetic winding 36 to withdraw the armature 36*a*. All of the remaining pulses, other than the first negative pulse, are not operative and have no effect in this embodiment, because the shutter, in running down from its cocked or tensioned position, takes only a single photograph and the magnetic armature 36*a* is only disposed on a single occasion in the blocking position. It is possible, however, to use more than one of these periodic pulses of the pulse chains 33*a*, 33*b*, etc., additionally for control of exposure times and intervals in the case of a periodic series of succession of photographs, that is, what are called series pictures or sequence pictures. An example of an embodiment of the present invention as applied to a series camera will be described below.

FIG. 7 shows a schematic block wiring diagram for a series picture camera, with some of the structural details of the camera. In FIG. 7, the block 1 indicates the pulse generator, corresponding to the block 1 in FIG. 1. The blocks 2, 2*a*, 2*b* . . . 2*e*, etc., are frequency dividers, corresponding to the dividers 2*a* . . . 2*e* of FIG. 1. In the series camera of FIG. 7, the first frequency divider 2 is electrically connected to one end stage or amplifier stage 3*f*, like the amplifier stage 3 of FIG. 1, and any selected one of the remaining frequency dividers 2*a* . . . 2*e* is connected by the slider 4 and conductor 6 to a second end stage or amplifier stage 3*s*.

The camera 7 has a light aperture L, passage of light through which is controlled by a single shutter blade 8*s*, pivotally mounted on the camera housing on a pivot pin 8*a*. The shutter blade also has a driving pin 8*b* which engages in a driving slot 9*a* in a driving rod 9*b* connected at one end to the armature 36*fa* of the magnetic winding which forms part of the amplifier stage 3*f*, and connected at the other end to the armature 36*sa* of the magnetic winding which forms part of the amplifier stage 3*s*. The rest position or closed position of the shutter blade 8*s* is determined by the stop pin 10*s*, while the open position is limited by the stop pin 10*f*. The shutter blade also has a pivoting spring associated therewith, to tend to throw it over to its extreme position when it passes approximately its central position during movement in either direction. For the sake of clarity of the drawings, this spring is not shown in FIG. 7, but various forms of such spring are illustrated and described in connection with FIGS. 10, 11, and 12.

In this embodiment, as soon as the switch 12 of the pulse generator 1 is closed, the pulse chain 18 starts, and passes from the generator 1 to the frequency divider series 2, 2*a* . . . 2*e*. The first negative pulse at the output of the frequency divider 2 sets the end stage or amplifier stage 3*f* into operation, thereby energizing the magnetic winding 36*f* (see FIG. 9) which attracts the armature 36*fa* so that the rod 9*b* is pulled to the left as viewed as in FIG. 7, opening the shutter blade 8*s*. The electric pulse in the magnetic winding 36*f* of the amplifier stage 3*f* lasts for only a short interval, so that it is only able to bring about the initial movement of the shutter blade toward its open position. The remainder of the movement toward the open position is brought about by the spring associated with the shutter blade, as described in more detail below.

The frequency divider 2 also passes the pulses on to the other frequency dividers in the series 2*a* . . . 2*e*. Depending on the required exposure time, set by appropriate adjustment of the slide 4 by the adjusting means 5, the output of one of the frequency dividers (in the case illustrated in FIG. 7, the divider 2*b*) is applied through the conductor 6 to the second end stage or amplifier component 3*s*. Thus, after a delay appropriate to the selected frequency division and after the production of the opening pulse has opened the shutter blade, the closing pulse is transmitter to the closing stage 3*s*, the magnetic winding 36*s* of which is now energized to attract the armature 36*sa* to pull the rod 9*a* back in a rightward direction when viewed as in FIG. 7, thereby moving the shutter blade 8*s* back to its closed position against the stop pin 10*s*. The closing movement, after being initiated by the magnetic winding, is completed by the spring. A photograph has thus been taken. However, since pulses from the pulse generator 1 continue to be transmitted (so long as the main switch remains closed) the winding 36*f* of the shutter opening component 3*f* will again be actuated, following which there will again be another actuation of the winding 36*s* of the closing component 3*s*, and this action of successively opening and closing the shutter blade in rapid succession will continue indefinitely as long as the main switch remains closed. Thus the camera will make what is called a series picture, forming either a multiple exposure on the same area of film (in case a special effect of this kind is desired) or forming individual exposures on different areas of film, if the camera is equipped with any conventional known means for rapid advancement or feeding of the film between successive exposures of the series.

Figure 8:
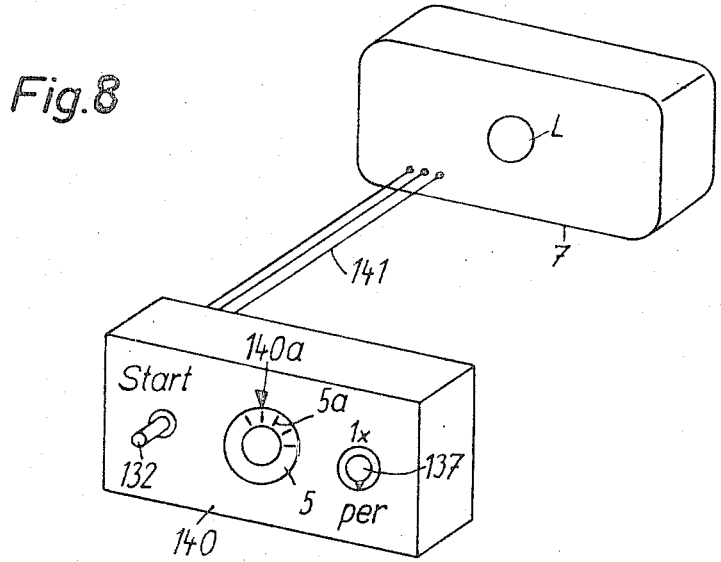
FIG. 8 is a schematic perspective view illustrating the present invention applied to a camera for taking either single photographs or a series of photographs in rapid succession.
Figure 9:
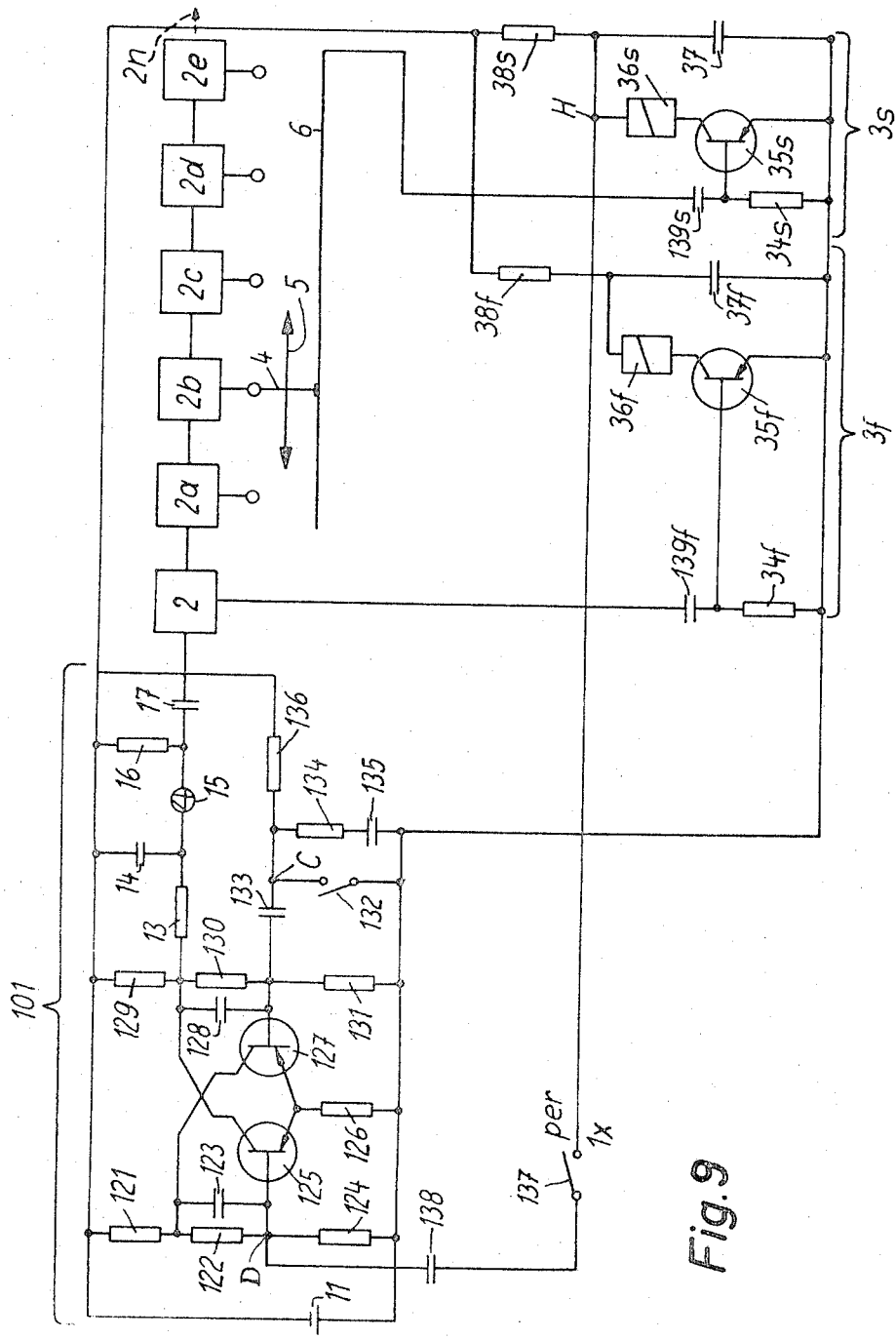
FIG. 9 is a wiring diagram illustrating further details of the electrical arrangement partially illustrated in FIGS. 7 and 8.

Reference is now made to FIGS. 8 and 9, illustrating an embodiment of the invention in which the electrical control arrangement or system allows the optional taking of either a series of photographs, or a single photograph. In this construction, the camera is again indicated at 7 (in FIG. 8) and the shutter with its mechanical operating linkage is the same as in FIG. 7. The end stages or amplifier stages 3f and 3s are installed within the camera, as shown in FIG. 7, and they include the windings 36f and 36s which are illustrated in FIG. 9. The remaining electrical equipment is installed in a separate switch box 140 which is connected through the conductors schematically indicated at 141 to the equipment inside the camera 7. The switch box 140 also carries the setting member 5 and its scale 5a, read in connection with a fixed index mark or reference point 140a. The electrical structure of this system is illustrated in FIG. 9.

This system illustrated in connection with FIGS. 8 and 9 operates in substantially the same manner as that disclosed in connection with FIGS. 1–4 and 7, with the difference that the pulse generator element or component is not in the form illustrated in FIG. 2, but rather is in the form illustrated in the portion 101 of FIG. 9. It will be noted that the pulse generator 101 does not have a mechanical switch like the switch 12 in FIG. 2, for initiating the pulse output, but on the contrary has an electronic switch in the form of a flip-flop stage. For this reason, it includes not only the elements 11 and 13 to 17, which are the same as those bearing the similar reference numerals in FIG. 2, but also the transistors 125 and 127, resistors 121, 122, 124, 126, 129, 130, 131, 134, and 136, and the capacitors 123, 128, 133, 135, and 138, all connected in the manner clearly shown in FIG. 9. In addition, there is a manually operated selector switch 137 arranged in series with the capacitor 138, in a circuit conductor leading from the point D (between the resistors 122 and 124) to the point H at one end of the magnetic winding 36s. This manually operable switch 137, schematically shown both in FIG. 8 and in FIG. 9, is movable between an open position indicated by the legend "per" (standing for "periodic" or series photographs) and a closed position indicated by the legend "1x" (standing for a single exposure). In addition, there is a trip switch or trigger switch 132 in a conductor leading to the input point C (in the portion 101 of FIG. 9) and this is conveniently in the form of a manually operated plunger or button as shown schematically in FIG. 8, which is pressed to close the switch 132 momentarily to initiate the action.

It will be noted that the pulse generator shown in the portion 101 of FIG. 9 is quite similar to the frequency divider shown in FIG. 3, but does not have the two rectifiers 40 and 41 which are present in the frequency divider. Instead, there are two separate inputs C and D in the arrangement shown in FIG. 9. When the trip button 132 is depressed to close this switch, and with the selector switch 137 open or in its "per" position, the capacitor 135, previously charged through the resistances 134 and 136, is discharged. This causes a positive pulse to pass via the capacitor 133 to the transistor 127, and the latter is thus blocked. Simultaneously with this, the other transistor 125 becomes conductive, and there is a voltage drop at the resistor 129 sufficient to set the pulse generator 101 into action. Since the flip-flop stage remains switched over (that is, it does not become reversed) an uninterrupted periodic succession of pulses is produced by the pulse generator, and the pulses are conducted to the series of frequency dividers 2, 2a, 2b, etc., in the manner explained above. Thus, periodic photographs or series photographs are taken in rapid succession by operation of the shutter 8s, as described in connection with FIG. 7.

On the other hand, if the connection between the points D and H is made by closing the selector switch 137 to the "1x" position, then the positive pulse which is produced upon operation of the closure magnet 36s is transmitted to the transistor 125 and blocks this transistor, thereby arresting the operation of the pulse generator 101 as soon as the magnetic winding 36s has operated to close the shutter. Hence there is only a single opening and closing movement of the shutter blade 8s, and only a single exposure is made, instead of a continuing series of exposures.

The individual elements of the electrical control system or arrangement may, in practice, take forms other than those which have been described merely as illustrative examples. Thus, instead of using flip-flop stages as the frequency dividers, the frequency dividers may be of the conventional known type utilizing pre-magnetized ring cores of very small construction, thus enabling dividing the frequency not only by the factor "2" but also by any other required whole number. Moreover, the pulse generator may incorporate transistors and may be stabilized by frequency standards, as well understood in the electronics art. Also, the periodic pulse chains may be produced by the well known Miller Integrators, as well understood in connection with oscillographs and other apparatus in which electric pulses are used.

Figure 10:
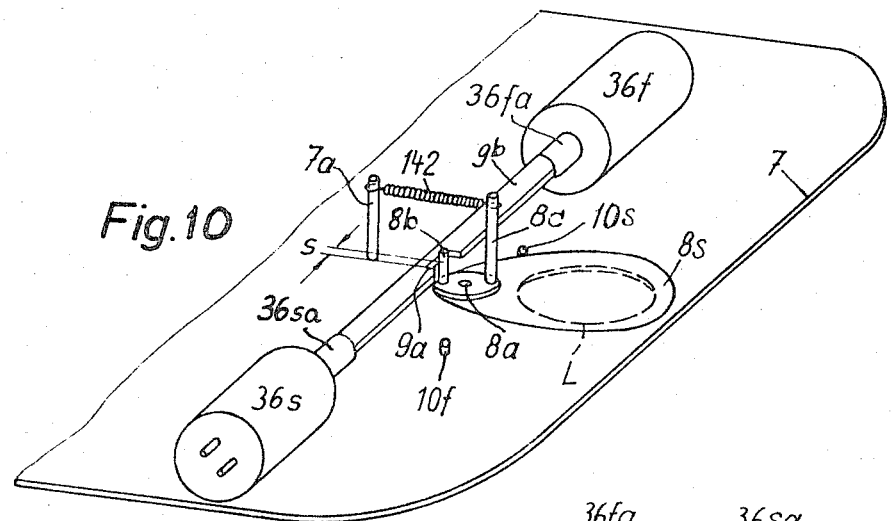
FIG. 10 is a schematic perspective view illustrating certain mechanical details of an arrangement for actuating the shutter.

Referring now to FIG. 10, further details of the shutter operating mechanism are here shown. The shutter blade 8s pivoted at 8a may, for example, have a pin 8c to which is anchored one end of the rocker spring 142, the other end thereof being anchored to a fixed pin 7a on the camera 7. A clearance S is provided between the driving pin 8b of the shutter and the end of the driving slot 9a in the rod 9b, this clearance being present at each of the two end positions of the rod and the shutter blade. Hence when the magnetic winding 36f or 36s, as the case may be, is energized by the short pulse, the rod starts to move through the lost motion provided by the clearance S, and thus attains a certain velocity before the end of the slot 9a makes contact with the driving pin 8b of the shutter blade 8s. Thus the kinetic energy resulting from the rapid movement of the mass represented by the parts 9b, 36fa, and 36sa, is imparted to the driving pin 8b of the shutter blade, and assists in moving the blade rapidly toward its alternate position. The force of the magnetic winding, assisted by the kinetic energy effect above mentioned, is sufficient at least to carry the shutter blade over the dead center point of the spring 142, and the force of the spring 142 is now available to insure completion or continued movement of the blade 8s until the latter reaches its end or limit position, regardless of whether this is a movement in the opening direction or in the closing direction.

Figure 11:
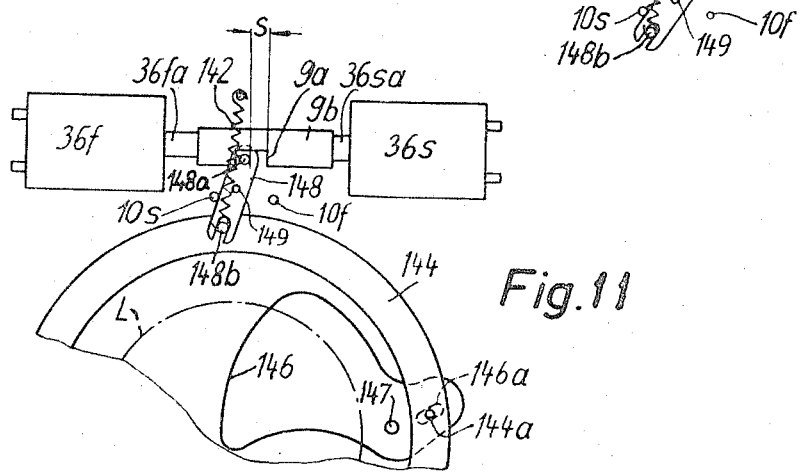
FIG. 11 is a schematic front elevation of the mechanical connections for actuating a different type of shutter.

The two pulse-operated magnets can also be used to produce the alternate opening and closing movements of the shutter, in the case of a so-called blade shutter, or one having a plurality of blades pivoted at intervals around the exposure opening or aperture. An example of this is illustrated in FIG. 11, where the exposure aperture L is closed by a plurality of shutter blades 146 each mounted on a pivot 147, and having a slot 146a engaged by a pin 144a on a blade ring 144 rotatable about the optical axis as a center, in one direction or the other for opening and closing all of the shutter blades 146 simultaneously, in familiar manner. Only one blade is shown in FIG. 11, for the sake of simplicity of the drawing.

The blade ring 144 may be turned first in one direction and then in the other, for opening and closing the blades, by means of an intermediate lever 148 pivoted to a fixed part at 149 and having a driving pin 148a engaged in the driving slot 9a of the thrust rod 9b which is operated by the magnets in the same manner as the thrust rod 9b in the previously described embodiments. A driving pin 148b on the blade ring 144 engages a slot in the opposite end of the intermediate lever 148 from the pin 148a. The spring 142 acts like the spring in FIG. 10, to carry the lever 148 to the end of its motion when it goes beyond dead center in either direction.

Figure 12:
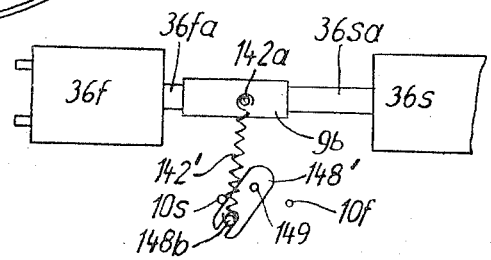
FIG. 12 is an alternative arrangement showing still another arrangement for actuating the shutter.

FIG. 12 illustrates an alternative arrangement in which the rocker spring 142′ may be anchored directly to the thrust rod 9b at 142a, instead of being anchored to a fixed pin.

It will be noted that in the three embodiments illustrated in FIGS. 10, 11, and 12, the rocker spring or pivot spring 142 or 142′ not only assists the latter part of the opening or closing movement of the shutter blade, but also serves to maintain the shutter blade or blades in the required end or limit position against the limit stop 10s or 10f as the case may be.

Figure 13:
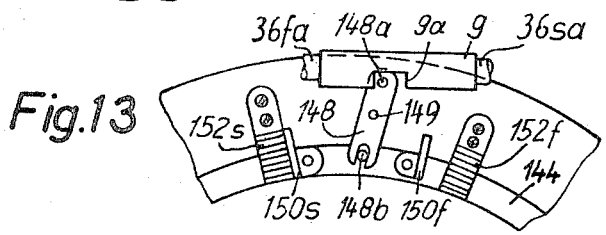
FIG. 13 is a fragmentary view illustrating still another shutter actuating arrangement.

Referring now to FIG. 13, there is shown an embodiment in which additional force for completing the opening or closing movement of the shutter is derived from permanent magnets rather than from a rocker spring like 142 or 142′. The blade ring partially shown at 144 in FIG. 13 corresponds to the blade ring 144 in FIG. 11. It may be operated, as in FIG. 11, by an intermediate lever 148 pivoted as before at 149, having one end engaging the driving pin 148b on the blade ring, and having at its other end a pin 148a engaged in the slot 9a of the rod 9b which is operated by the magnet windings. The same clearance S is provided as described above. But instead of using a spring like the former spring 142, the blade ring 144 is provided with two armatures 150s and 150f secured in insulated fashion to the blade ring. These armatures are adapted to be attracted alternately by permanent magnets 152s and 152f, respectively, which are fixed to a fixed part of the shutter mechanism, at the ends of the path of travel of the blade ring.

In this embodiment, when the short pulse produced by one of the magnet windings starts the blade ring 144 moving in the appropriate direction, it pulls the armature 150s or 150f away from its associated permanent magnet 152s or 152f, as the case may be, and moves the other armature toward its associated permanent magnet. After it passes approximately the mid point of its range of motion, the magnet toward which its associated armature is moving attracts this armature with greater force than the magnet which the other armature is leaving, and thus completes the movement of the blade 144 in the appropriate direction, even though the electrical pulse which initiated the movement has meanwhile been completed and no further power is being applied to the rod 9b. These arrangements of the permanent magnets shown in FIG. 13, or the springs shown in FIGS. 10–12, serve to complete the opening or closing movements of the shutter, notwithstanding that the electrical pulse which initiates the respective movements is very short and may perhaps be of insufficient duration to complete the opening or closing movement by itself.

Those skilled in the art of transistor circuitry will readily be able to select suitable values and characteristics for the various resistors, capacitors, transistors, and other components of the electrical circuit, and will readily understand that such values and characteristics can be changed within wide limits.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera having a shutter, and electrical means including at least one armature for controlling at least a part of the operation of said shutter, said electrical means comprising means for generating a series of electric pulses, a series of pulse frequency dividers, means operatively connecting said generating means and said frequency dividers to each other to apply the output of said generating means to the input of the first one of said series of frequency dividers and the output of each of said frequency dividers to the input of the next succeeding frequency divider in the series, an output contact operatively connected to the output of each of said frequency dividers, an end stage and at least one magnetic winding energized upon activation of said end stage for operating upon a shutter-controlling armature, and a setting member for connecting said end stage electrically to any selected one of said output contacts, so that the pulse frequency, divided by the selected number of frequency dividers, will be applied to said end stage to energize said magnetic winding, thereby to operate said armature.

2. Means for controlling a variable time interval in the operation of a shutter of a photographic camera, said means comprising:
 (a) an electrical pulse generator for generating a succession of pulses at a predetermined frequency;
 (b) a plurality of frequency dividers arranged in series with each other, the first frequency divider receiving its input from the output of said pulse generator, and each successive frequency divider receiving its input from the output of the previous frequency divider in the series;
 (c) an amplifying end stage unit;
 (d) a magnetic winding arranged to receive current from said end stage unit;
 (e) an armature responsive to flow of current through said magnetic winding for controlling at least in part the variable time interval which is to be controlled;
 (f) selectively settable switching means for operatively connecting the input of said end stage unit to the output of any selected one of said frequency dividers; and
 (g) a switch for initiating operation of said pulse generator at the beginning of the time interval to be controlled;
 (h) the parts being so arranged that operation of said pulse generator will cause pulses at successively slower frequencies to issue from the outputs of successive frequency dividers and will activate said end stage unit to cause current to flow through said winding to move said armature at a time interval after initiation of operation of said pulse generator which is variable and is dependent upon which one of the outputs of the frequency dividers is connected to the input of said end stage.

3. A construction as defined in claim 1, wherein each frequency divider comprises a flip-flop stage which divides the input frequency by a factor of 2 and is equipped with associated transistors, capacitors, and resistors, this flip-flop stage being of flat form.

4. A construction as defined in claim 1, wherein said means for generating a series of pulses includes a four-layer diode operatively connected to a capacitor, a resistor, and a source of current.

5. A construction as defined in claim 1, wherein said end stage includes a current source and an amplifier responsive to negative input pulses.

6. A construction as defined in claim 1, in which said shutter has a blade operating member movable to open and close at least one shutter blade, and in which said armature serves, until moved by energizing said magnetic winding, to block movement of said blade operating member in a position in which said shutter blade is open.

7. A construction as defined in claim 1, in which said shutter has a blade operating member movable to open and close at least one shutter blade, and in which said armature is coupled to said blade operating member.

8. A construction as defined in claim 1, in which there are two end stages each having a separate magnetic winding, and in which the inputs of said end stages are electrically connected to the outputs of two different frequently dividers.

9. A construction as defined in claim 8, in which energization of the magnetic winding of one of said end stages initiates shutter opening movement and energization of the magnetic winding of the other of said end stages initiates shutter closing movement.

10. A construction as defined in claim 9, further including additional power means for completing shutter opening and closing movements after such movements have been initiated by energization of said windings.

11. A construction as defined in claim 9, further including a rocker spring for completing shutter opening and closing movements after such movements have been initiated and only partially performed by energization of said windings.

12. A photographic camera having a shutter including mechanical blade operating means and at least one shutter blade moved between open and closed positions at least partly by movement of said blade operating means, a first electromagnetic winding having a first armature effective, when a current pulse is impressed on said first winding, to start movement of said blade operating means from blade-closed position toward blade-open position, a second electromagnetic winding having a second armature effective, when a current pulse is impressed on said second winding, to start movement of said blade operating means from blade-open position toward blade-closed position, additional power means for completing movement of said shutter blade in the appropriate direction between closed position and open position, when the current pulse impressed on one of said windings is of insufficient duration to insure complete movement of the shutter blade, a pulse generator, a series of frequency dividers having respective input and output connections and electrically connected so that the first divider receives input from said pulse generator and each succeeding divider in the series receives input from the output of the next preceding divider in the series, means for impressing on said first electromagnetic winding a current pulse from the output of one of said dividers, and adjustable means for impressing on said second electromagnetic winding a current pulse from the output of any selected one of said dividers other than the one whose output is impressed on said first winding.

13. A photographic camera having a shutter including mechanical blade operating means and at least one shutter blade moved between open and closed positions at least partly by movement of said blade operating means, a first electromagnetic winding having a first armature effective, when a current pulse is impressed on said first winding, to start movement of said blade operating means from blade-closed position toward blade-open position, a second electromagnetic winding having a second armature effective, when a current pulse is impressed on said second winding, to start movement of said blade operating means from blade-open position toward blade-closed position, and additional power means for completing movement of said shutter blade in the appropriate direction between closed position and open position, when the current pulse impressed on one of said windings is of insufficient duration to insure complete movement of the shutter blade, the respective armatures of the two electromagnetic windings being interconnected to each other by a thrust rod, and said thrust rod having a driving slot to accommodate a driving pin forming part of the blade operating means.

14. A construction as defined in claim 13, in which there is a clearance for play between said driving pin and said driving slot when the parts are in either of their two limit positions.

15. A construction as defined in claim 14, in which said clearance is sufficiently great so that said thrust rod, when starting to move from one limit position toward its other limit position, may attain a substantial velocity before it engages said driving pin, whereby the kinetic energy of the moving thrust rod assists in moving the blade operating means.

16. A construction as defined in claim 13, in which said blade operating means includes a double-armed intermediate lever having said driving pin thereon, and in which said additional power means includes a rocker spring having one end moving with said intermediate lever.

17. A construction as defined in claim 16, in which the other end of said rocker spring is fixedly anchored.

18. A photographic camera having a shutter including mechanical blade operating means and at least one shutter blade moved between open and closed positions at least partly by movement of said blade operating means, a first electromagnetic winding having a first armature effective, when a current pulse is impressed on said first winding, to start movement of said blade operating means from blade-closed position toward blade-open position, a second electromagnetic winding having a second armature effective, when a current pulse is impressed on said second winding, to start movement of said blade operating means from blade-open position toward blade-closed position, and additional power means for completing movement of said shutter blade in the appropriate direction between closed position and open position, when the current pulse impressed on one of said windings is of insufficient duration to insure complete movement of the shutter blade, the respective armatures of the two electromagnetic windings being interconnected to each other by a rod, and said blade operating means comprising a pivoted lever driven at least in part by endwise movement of said rod.

19. A construction as defined in claim 18, in which said blade operating means includes a rotatable blade ring connected to said lever to be turned in one direction or the other by swinging movement of said lever.

20. A construction as defined in claim 18, in which said additional power means includes a spring having one end moving with said lever and the other end anchored to a fixed part.

21. A construction as defined in claim 18, in which said additional power means includes a spring having one end moving with said lever and the other end anchored to and moving with said rod.

References Cited
UNITED STATES PATENTS

| | | | |
|---|---|---|---|
| 621,332 | 3/1899 | Esmond | 95—60 |
| 2,533,800 | 12/1950 | Hearn | 95—53 |
| 2,999,445 | 9/1961 | Fahlenberg | 95—63 |
| 3,092,002 | 6/1963 | Frenk | 95—58 |

JOHN M. HORAN, *Primary Examiner.*